B. F. JOSLYN.

Revolver.

No. 48,287.

Patented June 20, 1865.

Witnesses.
Wm Albert Steel.
W R Delany.

Inventor:
Henry Plowden
Atty for B. F. Joslyn

UNITED STATES PATENT OFFICE.

B. F. JOSLYN, OF STONINGTON, CONNECTICUT.

IMPROVEMENT IN REVOLVING FIRE-ARMS.

Specification forming part of Letters Patent No. 48,287, dated June 20, 1865; antedated June 14, 1865.

*To all whom it may concern:*

Be it known that I, B. F. JOSLYN, of Stonington, in the county of New London and State of Connecticut, have invented an Improvement in Revolving Fire-Arms; and I do hereby declare the following to be a full, clear, and exact description of the same, reference being had to the accompanying drawings, and to the letters of reference marked thereon.

My invention consists of a mode, fully described hereinafter, of constructing the frame and barrel of a revolving fire-arm and securing them to each other in order that the several parts may be simple in construction, accessible to appropriate shaping-tools, and so that the barrel can be readily detached from the frame when repairs are necessary.

In order to enable others skilled in the art to make my invention, I will now proceed to describe the manner of constructing the same.

Figure 1:
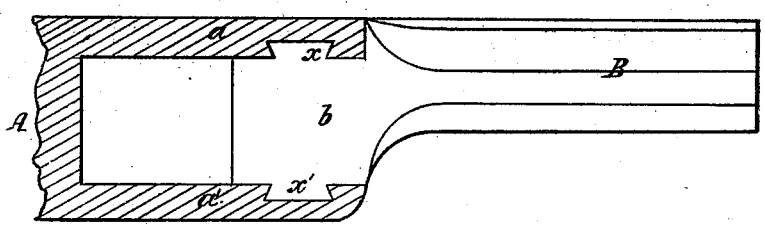
Figure 2:
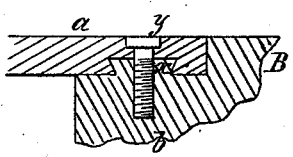

On reference to the accompanying drawings, which form a part of this specification, Figure 1 is a side view of sufficient of a revolving fire-arm to illustrate my improvement, and Fig. 2 a sectional view of part of Fig. 1.

A represents a portion of the frame, and B the barrel, of my improved fire-arm, the rear of the frame being secured to or forming a part of the stock, as usual, but the front of the frame being open instead of closed, as in other revolving fire-arms in which the barrel is screwed into the closed end of the frame. The barrel has at its rear end an enlargement, $b$, to which are fitted the two projections $a$ and $a'$ of the frame, in the following manner: In the under side of the projection $a$ is a dovetailed recess for the reception of the dovetailed projection $x$ on the enlargement $b$ of the barrel, and in the upper side of the projection $a'$ of the frame is a dovetailed recess for the reception of the dovetailed projection $x'$ on the barrel. The several parts are made to fit accurately and tightly, the enlargement of the barrel with its projections being driven laterally into its place between the projections $a$ and $a'$ of the frame. Additional security is afforded by set-screws $y$, Fig. 2, one of which passes through each of the projections of the frame and screws into the enlargement at the rear of the barrel.

The above-described method of constructing the frame and barrel and securing them to each other affords several advantages.

First, the frame itself is more simple in construction than such as are closed in front.

Second, the frame is more accessible to appropriate shaping-tools than the usual frame.

Third, the mode of securing the barrel to the frame affords greater facilities for readily detaching them from each other than when they are fitted together in the usual manner.

I wish it to be understood that I do not desire to claim broadly so constructing the frame and barrel of a revolver that the rear of the barrel shall fit the open front end of the frame, but

I claim as my invention and desire to secure by Letters Patent—

The frame with its two projections, $a$ $a'$, and their dovetailed recesses, in combination with the enlargement $b$ of the barrel and its dovetailed projections $x$ and $x'$, the several parts being arranged and adapted to each other, as set forth.

In testimony whereof I have signed my name to this specification in the presence of two subscribing witnesses.

B. F. JOSLYN.

Witnesses:
CHRISTIAN VON HESSE,
WM. H. ARTHUR.